United States Patent
Jo et al.

(10) Patent No.: US 10,559,824 B2
(45) Date of Patent: Feb. 11, 2020

(54) POSITIVE ELECTRODE ACTIVE MATERIAL FOR LITHIUM SECONDARY BATTERY INCLUDING CORE CONTAINING LITHIUM COBALT OXIDE AND SHELL BEING DEFICIENT IN LITHIUM, AND METHOD OF PREPARING THE SAME

(71) Applicant: LG Chem, Ltd., Seoul (KR)

(72) Inventors: Chi Ho Jo, Daejeon (KR); Sungbin Park, Daejeon (KR); Younguk Park, Daejeon (KR); Bo Ram Lee, Daejeon (KR); Hyuck Hur, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 29 days.

(21) Appl. No.: 15/689,385

(22) Filed: Aug. 29, 2017

(65) Prior Publication Data

US 2018/0062173 A1  Mar. 1, 2018

(30) Foreign Application Priority Data

Sep. 1, 2016 (KR) .................... 10-2016-0112595

(51) Int. Cl.
*H01M 4/525* (2010.01)
*C01G 51/00* (2006.01)
*H01M 10/0525* (2010.01)

(52) U.S. Cl.
CPC ............ *H01M 4/525* (2013.01); *C01G 51/42* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2011/0136013 A1 | 6/2011 | Liu et al. | |
| 2012/0034503 A1* | 2/2012 | Toyama | H01M 4/131 429/91 |
| 2017/0222211 A1 | 8/2017 | Ryu et al. | |
| 2017/0222225 A1 | 8/2017 | Kang et al. | |
| 2017/0309910 A1* | 10/2017 | Jo | H01M 4/366 |
| 2017/0317342 A1 | 11/2017 | Kang et al. | |

FOREIGN PATENT DOCUMENTS

| | | | | |
|---|---|---|---|---|
| CN | 101901906 A | | 12/2010 | |
| KR | 20010047852 A | | 6/2001 | |
| KR | 100788257 B1 | | 12/2007 | |
| KR | 20160039983 A | | 4/2016 | |
| KR | 20160040116 A | | 4/2016 | |
| KR | 20160040117 A | | 4/2016 | |
| KR | 20160040118 A | | 4/2016 | |
| KR | 20160040119 A | * | 4/2016 | ............ H01M 4/366 |

* cited by examiner

*Primary Examiner* — Daniel S Gatewood
(74) *Attorney, Agent, or Firm* — Lerner, David, Littenberg, Krumholz & Mentlik, LLP

(57) ABSTRACT

Provided is a positive electrode active material particle for a secondary battery, including a core part containing lithium cobalt oxide; and a shell part that is located on the surface of the core part and contains lithium-deficient cobalt oxide which is deficient in lithium because a molar ratio of lithium to cobalt is 0.9 or less.

16 Claims, 1 Drawing Sheet

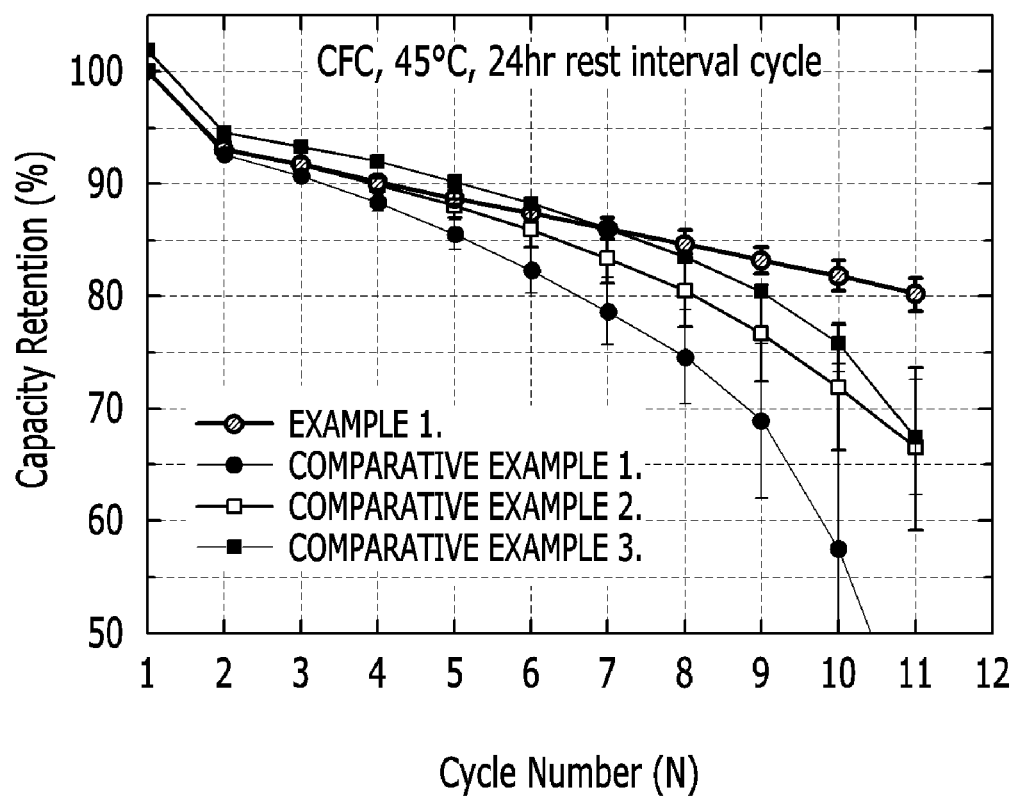

POSITIVE ELECTRODE ACTIVE MATERIAL FOR LITHIUM SECONDARY BATTERY INCLUDING CORE CONTAINING LITHIUM COBALT OXIDE AND SHELL BEING DEFICIENT IN LITHIUM, AND METHOD OF PREPARING THE SAME

CROSS REFERENCE TO RELATED APPLICATIONS

This application claims the benefit of Korean Patent Application No. 10-2016-0112595 on Sep. 1, 2016 with the Korean Intellectual Property Office, the disclosure of which is herein incorporated by reference in its entirety.

TECHNICAL FIELD

The present invention relates to a positive electrode active material for a lithium secondary battery, including a core containing lithium cobalt oxide and a shell being deficient in lithium, and a method of preparing the same.

BACKGROUND ART

With increasing technology developments and demands for mobile devices, demands for secondary batteries as an energy source have rapidly increased, and among such secondary batteries, lithium secondary batteries having high energy density and working potential, a long lifespan, and a low self-discharge rate have been commercialized and widely used.

Further, with growing concerns about environmental issues, many studies have been conducted on electric vehicles and hybrid electric vehicles which may be employed in place of vehicles using fossil fuels, such as gasoline vehicles, diesel vehicles, etc. which are one of major causes of air pollution. Although nickel hydrogen metal secondary batteries have been mainly used as a power source of the electric vehicles and hybrid electric vehicles, use of lithium secondary batteries having high energy density and discharge voltage has been actively studied, and some of them are now commercially available.

As a positive electrode material for the lithium secondary battery, $LiCoO_2$, ternary materials (NMC/NCA), $LiMnO_4$, $LiFePO_4$, etc. are used.

Meanwhile, a technology for using a battery system in a high voltage band has been recently developed for high capacity of secondary batteries. Generally, secondary batteries have a charge/discharge range of 3.0 V to 4.2 V, but it has been studied that a higher charging voltage (4.2 V to 4.5 V) than the charging voltage is applied to obtain a higher energy capacity.

In particular, $LiCoO_2$ has excellent physical properties such as high rolling density, etc., and excellent electrochemical properties such as high cycling property, and therefore, it has been frequently used until now. However, since $LiCoO_2$ has a charge/discharge current capacity as low as about 150 mAh/g, it is necessary to apply a higher charging voltage (4.2 V to 4.5 V) in order to achieve high capacity.

However, when the charging voltage is set at 4.3 V or higher, there are problems in that a crystal structure of the active material becomes unstable due to increased oxidation power, deterioration of negative and positive electrodes becomes worse, as the charge/discharge cycle progresses, and change of $Co^{3+}$ ions of lithium-cobalt oxide into $Co^{4+}$ ions which are highly reactive to an electrolyte is increased to increase the decomposition reaction of the electrolyte, leading to rapid deterioration of surface stability of the active material and lifetime property of the battery and ignition by reactions with the electrolyte.

Accordingly, it is necessary to develop a lithium cobalt oxide-based positive electrode active material capable of ensuring surface stability without deterioration of performances at high voltages.

DISCLOSURE

Technical Problem

An object of the present invention is to solve the above-described problems of the prior art and the technical problems which have been demanded to be solved.

The present inventors have conducted intensive studies and various experiments, and as described below, they found that when a positive electrode active material includes a core part containing lithium cobalt oxide and a shell part that is located on the surface of the core part and contains lithium-deficient cobalt oxide which is deficient in lithium because a molar ratio of lithium to cobalt is 0.9 or less, the desired effects may be obtained, thereby completing the present invention.

Technical Solution

Accordingly, a positive electrode active material particle for a secondary battery according to the present invention is characterized by including a core part containing lithium cobalt oxide; and a shell part that is located on the surface of the core part and contains lithium-deficient cobalt oxide which is deficient in lithium because a molar ratio of lithium to cobalt is 0.9 or less.

In general, when lithium cobalt oxide as a positive electrode active material is used at a high voltage, there are problems in that a large amount of lithium ions are released from lithium cobalt oxide particles to destroy a crystal structure, and the resulting unstable crystal structure is broken down, and eventually, the reversibility of the structure is reduced. In addition, when $Co^{3+}$ or $Co^{4+}$ ions present on the surface of lithium cobalt oxide particles are reduced by an electrolyte in a state where lithium ions are released, oxygen is removed from the crystal structure, and the above breaking of the structure is further promoted.

Therefore, in order to stably use lithium cobalt oxide at a high voltage, side reactions between the cobalt ions and the electrolyte should be suppressed while stably maintaining the crystal structure even though a large amount of lithium ions are released.

Accordingly, in the present invention, lithium-deficient cobalt oxide which generates $Co^{4+}$ ions with higher reactivity to the electrolyte at a relatively low proportion under the battery charge condition of 4.4 V or more is included in the shell part, thereby achieving optimum effects of effectively preventing deteriorations in surface stability of the positive electrode active material and cycling property of the secondary battery at high voltages.

Specifically, the shell part containing the lithium-deficient cobalt oxide generates a relatively small amount of tetravalent cobalt ions ($Co^{4+}$) in a charge/discharge range of 3.0 V to 4.6 V, compared to lithium cobalt oxide having a stoichiometric ratio of lithium:metal of 1:1, thereby providing stability of particle surface of lithium cobalt oxide of the shell part.

In a specific embodiment, a molar ratio of lithium:cobalt in the lithium-deficient cobalt oxide of the shell part may be in the range of 0.7:1 to 0.9:1. If the molar ratio is less than 0.7:1, the amount of lithium is relatively small, and therefore, it is difficult to achieve sufficient improvement of cycling property at high voltages, which is desired in the present invention. On the contrary, if the molar ratio is more than 0.9:1, and thus the amount of lithium is large, a large amount of tetravalent cobalt ions ($Co^{4+}$) is generated, and therefore, it is difficult to provide stability of the particle surface. Particularly, the molar ratio may be 0.8:1.

In a specific embodiment, the lithium cobalt oxide of the core part may have a composition of the following Chemical Formula 1:

$$Li_aCo_{1-b}M_bO_2 \quad (1)$$

wherein M is each independently one or more selected from the group consisting of Ti, Mg, Al, Zr, Ba, Ca, Ti, Ta, Nb, and Mo;
0.95≤a≤1.02; and
0≤b≤0.2.

More specifically, the lithium cobalt oxide of the core part may be $LiCoO_2$.

In a specific embodiment, the lithium-deficient cobalt oxide of the shell part may have a composition of the following Chemical Formula 2:

$$Li_{a'}Co_{1-b'}M_{b'}O_2 \quad (2)$$

wherein M is each independently one or more selected from the group consisting of Ti, Mg, Al, Zr, Ba, Ca, Ti, Ta, Nb, and Mo;
0.5≤a'≤0.9; and
0≤b'≤0.2.

More specifically, the lithium-deficient cobalt oxide of the shell part may be $Li_{0.8}CoO_2$.

In a specific embodiment, the shell part may include a relatively low concentration of lithium, compared to the core part, and lithium of the core part may be distributed at a uniform concentration in the core part, and lithium of the shell part may be distributed with a gradually increasing concentration gradient from the interface of the core and shell parts to the outer surface of the shell part. In this regard, the composition of the above Chemical Formula is an average composition of the shell part. Therefore, the present invention forms a state where the amount of lithium is deficient, compared to the amount of cobalt, on the surface of the shell part, that is, forms a lithium-deficient shell part, and therefore, when the positive electrode active material of the present invention is used at high voltages, a relatively small amount of tetravalent cobalt ions ($Co^{4+}$) is generated, thereby effectively increasing stability of the particle surface.

Specifically, the concentration gradient of lithium of the shell part may be controlled by controlling a secondary sintering time in a preparation method described below. As the sintering time is shortened, a difference of the concentration gradient may increase.

In a specific embodiment, a thickness of the shell part may be 30 nm to 500 nm, and particularly, 50 nm to 200 nm, 70 nm to 100 nm, and 30 nm to 100 nm.

If the thickness is less than 30 nm, the shell part may not be formed thick enough to improve the surface stability required in the present invention, and thus it may be difficult to improve the cycling property. On the contrary, if the thickness is more than 500 nm, the content of the lithium element per equal volume of the positive electrode active material may be reduced, and thus the energy density of the active material may be reduced.

In a specific embodiment, an average particle size ($D_{50}$) of the positive electrode active material may be 15 µm to 25 µm, and particularly, 15 µm to 20 µm or 20 µm to 25 µm.

Specifically, if the average particle size ($D_{50}$) is less than 15 µm, particles of the positive electrode active material are fine, and thus their specific surface area is increased to increase a content of a binder, leading to reduction in the battery capacity per equal volume. On the contrary, if the average particle size ($D_{50}$) is more than 25 µm, the size of the particles is too large, and therefore, battery efficiency relative to its weight may be reduced.

Further, the average particle size ($D_{50}$) of the positive electrode active material may be defined as a particle diameter at 50% in the particle diameter distribution. The average particle diameter (D50) of the positive electrode active material particle may be measured by, for example, a laser diffraction method.

In a specific embodiment, the surface of the shell part may be coated with metal oxide, and particularly, the surface of the shell part may be coated with $Al_2O_3$. In this regard, a coating thickness of $Al_2O_3$ may be 50 nm to 100 nm. More particularly, $Al_2O_3$ may be distributed on the surface of the shell part in the form of nano-powder.

Further, the present invention provides a method of preparing the positive electrode active material for the secondary battery, the method including:

(a) forming a spherical core part containing lithium cobalt oxide by mixing a cobalt source material and a lithium source material and then by primary sintering of the mixture;

(b) uniformly coating the outer surface of the core part with the cobalt source material, and then further injecting the lithium source material to mix them; and (c) forming a shell part by secondary sintering of the mixture of the process (b), wherein in the process (b), the amounts of the cobalt source material and the lithium source material are determined such that the molar ratio of lithium:cobalt in the shell part formed by the secondary sintering of the process (c) is within the range of 0.7:1 to 0.9:1.

That is, the method of preparing the positive electrode active material includes a process of mixing the cobalt source material and the lithium source material such that the spherical lithium cobalt oxide is formed as the core part, and the shell part in stoichiometrically lithium-deficient with respect to cobalt is formed on the outer surface of the core part.

In this regard, coating of the cobalt source material is not limited to a dry or wet method, and particularly, the cobalt source material may be coated by a drying method, and thereafter, $Li_2CO_3$ as the lithium source material may be injected.

Therefore, when the positive electrode active material for the secondary battery of the present invention may be prepared according to the above preparation method, the shell part containing lithium-deficient cobalt oxide having a molar ratio of lithium to cobalt of 0.7 to 0.9 may be formed on the outer surface of the core part containing lithium cobalt oxide, thereby achieving the effects of improving surface stability of the positive electrode active material and preventing deterioration in the cycling property of the secondary battery at high voltages.

In a specific embodiment, in the process (a) and/or the process (b), sintering may be carried out by further adding a doping precursor containing element A, and particularly, the element A may be one or more selected from the group consisting of Ti, Mg, Al, Zr, Ba, Ca, Ti, Ta, Nb, and Mo.

As described above, when sintering is carried out by further adding the doping precursor, changes in the surface structure of the positive electrode active material may be suppressed to improve stability and cycling property at high voltages.

More particularly, in the process (b), the amounts of the cobalt source material and the lithium source material may be determined such that the molar ratio of lithium:cobalt in the shell part formed by the secondary sintering of the process (c) is within the range of 0.8:1. That is, when the molar ratio of lithium:cobalt in the formed shell part is 0.8:1, the effect of preventing deterioration in the cycling property of the secondary battery at high voltages may be maximized.

In a specific embodiment, the lithium source material may be one or more selected from the group consisting of $Li_2CO_3$, LiOH, $LiNO_3$, $CH_3COOLi$ and $Li_2(COO)_2$, and particularly, the lithium source material may be LiOH.

Further, the cobalt source material may be one or more selected from the group consisting of $Co_3O_4$, cobalt acetate $(Co(C_2H_3O_2)_2)$, $Co(NO_3)_2$ and $Co(OH)_2$.

In a specific embodiment, in the process (a), a temperature of the primary sintering may be 950° C. to 1070° C., and a time of the primary sintering may be 8 hours to 12 hours. In the process (c), a temperature of the secondary sintering may be 900° C. to 1050° C., and a time of the secondary sintering may be 5 hours to 12 hours.

When the primary sintering and the secondary sintering are carried out at an excessively low temperature out of the above range or for a too short time, the internal structure and surface structure of the positive electrode active material particles may not be stably formed, and the lithium source may not penetrate enough. On the contrary, when the primary sintering and the secondary sintering are carried out at an excessively high temperature out of the above range or for a too long time, physical and chemical properties of lithium cobalt oxide constituting the positive electrode active material particles may be changed to cause deterioration of performances, which is undesirable.

Further, the present invention provides a positive electrode which is manufactured by applying a slurry containing the positive electrode active material for the secondary battery, a conductive material, and a binder onto a collector.

Specifically, the positive electrode may be manufactured by, for example, applying a positive electrode mix containing the positive electrode active material composed of positive electrode active material particles, a conductive material, and a binder onto a positive electrode collector, and if necessary, a filler may be further added to the positive electrode mix.

The positive electrode collector is generally fabricated to have a thickness of 3 μm to 201 μm. The positive electrode collector is not particularly limited as long as it has high conductivity without causing chemical changes in the batteries. The positive electrode collector may be, for example, any one selected from stainless steel, aluminum, nickel, titanium, and aluminum or stainless steel that is surface-treated with carbon, nickel, titanium, or silver, and particularly, aluminum may be used. The collector may increase adhesion of the positive electrode active material by forming a fine roughness on the surface. For example, the collector may be in a variety of forms such as a film, a sheet, a foil, a net, a porous material, a foamed material, a non-woven fabric material, etc.

The positive electrode active material may be composed of, in addition to the positive electrode active material particles, a layered structure compound such as lithium nickel oxide ($LiNiO_2$), etc., or a compound substituted with one or more transition metals; a lithium manganese oxide such as chemical formula of $Li_{1+x}Mn_{2-x}O_4$ (wherein x is 0~0.33), $LiMnO_3$, $LiMn_2O_3$, $LiMnO_2$, etc.; lithium copper oxide ($Li_2CuO_2$); vanadium oxides such as $LiV_3O_8$, $LiV_3O_4$, $V_2O_5$, $Cu_2V_2O_7$, etc.; a Ni site type lithium nickel oxide represented by Chemical formula $LiNi_{1-x}M_xO_2$ (wherein M is Co, Mn, Al, Cu, Fe, Mg, B or Ga, and x is 0.01 to 0.3); a lithium manganese complex oxide represented by chemical formula of $LiMn_{2-x}M_xO_2$ (wherein M is Co, Ni, Fe, Cr, Zn or Ta, and x is 0.01 to 1) or $Li_2Mn_3MO_8$ (wherein M is Fe, Co, Ni, Cu or Zn); $LiMn_2O_4$ wherein some Li of Chemical Formula is substituted with alkaline earth metals; disulfide compounds; $Fe_2(MoO_4)_3$, etc., but is not limited thereto.

The conductive material is generally added in an amount of 0.1 wt % to 30 wt % based on the total weight of the mixture including the positive electrode active material. The conductive material is not particularly limited, as long as it does not cause chemical changes in the battery and has conductivity. Examples of the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc.

The binder included in the positive electrode is a component that assists in bonding between the active material and the conductive agent and bonding with respect to the collector, and may be generally added in an amount of 0.1 wt % to 30 wt % based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

Further, the present invention provides a secondary battery which is characterized by including the positive electrode, a negative electrode and an electrolyte. The kind of the secondary battery is not particularly limited, but specific example thereof may include lithium secondary batteries having advantages of high energy density, discharge voltage, output stability, etc., such as a lithium ion battery, a lithium ion polymer battery, etc.

Generally, the lithium secondary battery includes a positive electrode, a negative electrode, a separator, and a non-aqueous electrolyte containing lithium salts.

Hereinafter, other components of the lithium secondary battery will be described.

The negative electrode may be fabricated by applying a negative electrode active material onto a negative electrode collector and drying the collector. If necessary, the above-described components included in the positive electrode may be further included.

The negative electrode collector may have a thickness ranging from 3 μm to 500 μm. This negative electrode collector is not particularly limited, as long as it does not cause chemical changes in the battery and has conductivity. For example, the negative electrode collector may include copper, stainless steel, aluminum, nickel, titanium, calcined carbon, or copper or stainless steel surface-treated with carbon, nickel, titanium, silver, etc., aluminum-cadmium alloy, etc. Like the positive electrode collector, the negative electrode collector may have fine roughness on the surface thereof so as to reinforce adhesion of the negative electrode active material, and may be used in a variety of forms such as a film, a sheet, a foil, a net, a porous material, a foamed material, a non-woven fabric material, etc.

The negative electrode active material may include, for example, carbon such as non-graphitized carbon, graphitized carbon, etc.; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, II or III elements of the periodic table, halogen; $0 < x \leq 1$; $1 \leq y \leq 3$; $1 \leq z \leq 8$), etc.; lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.: conductive polymers such as polyacetylene, etc.; Li—Co—Ni-based materials.

The separator is interposed between the positive electrode and the negative electrode. As the separator, an insulating thin film having high ion permeability and mechanical strength is used. The separator generally has a pore diameter of 0.01 µm to 10 µm and a thickness of 5 µm to 300 µm. As the separator, for example, a sheet or non-woven fabric made of olefin polymer, such as polypropylene having chemical resistance and hydrophobicity, etc.; glass fiber or polyethylene is used. When a solid electrolyte such as a polymer is employed as the electrolyte, the solid electrolyte may also serve as both the separator and the electrolyte.

The non-aqueous electrolyte containing lithium salts is composed of a non-aqueous electrolyte and lithium salt. A non-aqueous organic solvent, an organic solid electrolyte, or an inorganic solid electrolyte may be used as the non-aqueous electrolyte. However, the non-aqueous electrolyte is not limited thereto.

The non-aqueous organic solvent may be, for example, a non-protic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium salts are readily dissolved in the non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy in the non-aqueous electrolyte, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added. Optionally, halogen-containing solvents such as carbon tetrachloride or ethylene trifluoride may be further added in order to obtain flame resistance, or carbon dioxide gas may be further added in order to enhance high-temperature retention properties, and FEC (Fluoro-Ethylene Carbonate), PRS (Propene sultone), etc. may be further added.

Further, the present invention provides a battery pack including the secondary battery, and a device including the battery pack, and the above battery pack and device are known in the art, and therefore, specific descriptions thereof will be omitted in the present invention.

The device may be, for example, notebook computers, netbooks, tablet PC, mobile phones, MP3, wearable electronics, power tools, electric vehicles (EV), hybrid electric vehicles (HEV), plug-in hybrid electric vehicles (PHEV), E-bike, E-scooter, electric golf carts, or electric storage systems, etc., but is not limited thereto.

Effect of the Invention

As described above, a positive electrode active material according to the present invention may include a core part containing lithium cobalt oxide and a shell part containing lithium-deficient cobalt oxide which generates $Co^{4+}$ ions with higher reactivity to an electrolyte at a relatively low proportion under the charge condition of 4.4 V or more, thereby achieving effects of improving surface stability of the positive electrode active material and preventing deterioration in the cycling property of a secondary battery at high voltages.

BRIEF DESCRIPTION OF DRAWINGS

FIG. 1 is a graph showing capacity retention rates of batteries according to cycling of Example 1 and Comparative Examples 1, 2 and 3 according to Experimental Example 1.

DETAILED DESCRIPTION OF THE EMBODIMENTS

Hereinbelow, the present invention will be described with reference to Examples. A better understanding of the present invention may be obtained in light of the following Examples, but are not to be construed to limit the scope of the present invention.

Example 1

$Co_3O_4$ and $Li_2CO_3$ were dry-mixed at a molar ratio of Li:Co of 1:1, and then primary sintering was carried out in a furnace at 1,050° C. for 10 hours to prepare lithium cobalt oxide as a spherical core part, and $Co_3O_4$ was uniformly dry-coated at a thickness of 100 nm on the surface of the prepared core part such that a molar ratio of lithium:cobalt was 0.8:1 in a shell part formed by secondary sintering. $Li_2CO_3$ was further added thereto and mixed therewith, and this mixture was subjected to secondary sintering in the furnace at 1000° C. for 7 hours to form the shell part having a thickness of 100 nm, thereby synthesizing a positive electrode active material.

Example 2

An active material was synthesized in the same manner as in Example 1, except that $Co_3O_4$ was uniformly coated on the surface of the prepared core part such that a molar ratio of lithium:cobalt was 0.7: in the shell part formed by secondary sintering, and $Li_2CO_3$ was further added thereto and mixed therewith.

Example 3

An active material was synthesized in the same manner as in Example 1, except that $Co_3O_4$ was uniformly coated on the surface of the prepared core part such that a molar ratio of lithium:cobalt was 0.9:1 in the shell part formed by secondary sintering, and $Li_2CO_3$ was further added thereto and mixed therewith.

Comparative Example 1

An active material was synthesized in the same manner as in Example 1, except that $Co_3O_4$ was uniformly coated on the surface of the prepared core part such that a molar ratio of lithium:cobalt was 0.97:1 in the shell part formed by secondary sintering, and $Li_2CO_3$ was further added thereto and mixed therewith.

Comparative Example 2

An active material was synthesized in the same manner as in Example 1, except that $Co_3O_4$ was uniformly coated on the surface of the prepared core part such that a molar ratio of lithium:cobalt was 0.65:1 in the shell part formed by secondary sintering, and $Li_2CO_3$ was further added thereto and mixed therewith.

Comparative Example 3

An active material was synthesized in the same manner as in Example 1, except that $Co_3O_4$ was uniformly coated on the surface of the prepared core part such that a molar ratio of lithium:cobalt was 0.4:1 in the shell part formed by secondary sintering, and $Li_2CO_3$ was further added thereto and mixed therewith.

Experimental Example 1 (Measurement of Interval Cycle)

Each of the positive electrode active material particles prepared in Example 1 and Comparative Examples 1 to 3 was used, and PVdF as a binder and natural graphite as a conductive material were used. The positive electrode active material:binder:conductive material at a weight ratio of 96:2:2 were mixed well with NMP, and this mixture was applied to Al foil with a thickness of 20 μm, and dried at 130° C. to manufacture a positive electrode. As a negative electrode, lithium foil was used, and an electrolyte containing 1 M $LiPF_6$ in a solvent of EC:DMC:DEC=1:2:1 was used to manufacture a coin-type half cell.

During 1 cycle, the manufactured coin-type half cell was charged at 0.2 C to an upper voltage limit of 4.5 V at 45° C., and maintained in a rest state for 20 minutes, and then discharged at 0.2 C to a lower voltage limit of 3.0 V, and maintained in a rest state for 20 minutes. Thereafter, during 2 cycles, the cell was charged at 0.5 C to an upper voltage limit of 4.5 V at 45° C., and maintained in a rest state for 20 minutes, and then discharged at 1.0 C to a lower voltage limit of 3.0 V, and maintained in a rest state for 20 minutes. Thereafter, during 3 cycles, the cell was fully charged (SOC100) at 0.5 C to an upper voltage limit of 4.5 V at 45° C., and maintained in a rest state for 24 hours, and then discharged at 1.0 C to a lower voltage limit of 3.0 V, and maintained in a rest state for 20 minutes. Thereafter, during 4 cycles to 20 cycles, the charge-discharge cycling was carried out under conditions of the above-described 3 cycles. At this time, capacity retention rates were measured during 1 cycle to 11 cycles, and the results are shown in FIG. 1 below.

According to the interval cycle measurement described above, high-temperature lifespan and high-temperature storage capacity under harsh environmental conditions may be evaluated, because a fully charged secondary battery (SOC100) is stored in a rest state at a high temperature of 45° C. for 24 hours.

Referring to the following FIG. 1, although the cell of Example 1 was stored at a high temperature for 24 hours under a high voltage condition of 4.5 V, it showed a capacity retention rate of 80% or more to maintain high performance even after 11 cycles, compared to the cells of Comparative Examples 1 to 3, suggesting that since a molar ratio of lithium:cobalt in the shell part of the positive electrode active material was set to 0.7:1 to 0.9:1, generation of $Co^{4+}$ ions present on the surface of the shell part was reduced under the high voltage condition of 4.5 V, and therefore, side reactions with electrolytes were suppressed, thereby preventing a reduction in the capacity retention rate during charge/discharge cycling at the high temperature and pressure.

Although the present invention has been described in connection with the exemplary embodiments of the present invention, it will be apparent to those skilled in the art that various modifications and changes may be made thereto from the foregoing description without departing from the scope of the present invention.

The invention claimed is:

1. A positive electrode active material for a secondary battery, comprising:
    a core part including lithium cobalt oxide; and
    a shell part that is located on a surface of the core part and includes lithium-deficient cobalt oxide which is deficient in lithium because a molar ratio of lithium to cobalt is 0.9 or less,
    wherein a molar ratio of lithium:cobalt in the lithium-deficient cobalt oxide of the shell part is in the range of 0.7:1 to 0.9:1,
    wherein the lithium cobalt oxide of the core part has a composition of the following Chemical Formula 1:

$$Li_aCo_{1-b}M_bO_2 \quad (1)$$

wherein, in Chemical Formula 1, M is each independently one or more selected from the group consisting of Ti, Mg, Al, Zr, Ba, Ca, Ti, Ta, Nb, and Mo;
    $0.95 \le a \le 1.02$; and
    $0 \le b \le 0.2$, and
    wherein the lithium-deficient cobalt oxide of the shell part has a composition of the following Chemical Formula 2:

$$Li_aCo_{1-b}M_bO_2 \quad (2)$$

Wherein, in Chemical Formula 2, M is each independently one or more selected from the group consisting of Ti, Mg, Al, Zr, Ba, Ca, Ti, Ta, Nb, and Mo;
    $0.7 \le a \le 0.9$; and
    $0 \le b \le 0.2$.

2. The positive electrode active material for the secondary battery of claim 1, wherein the shell part including the lithium-deficient cobalt oxide generates a relatively small amount of tetravalent cobalt ions ($Co^{4+}$) in a charge/discharge range of 3.0 V to 4.6 V, compared to lithium cobalt oxide having a stoichiometric ratio of lithium:metal of 1:1, thereby providing stability of the particle surface of lithium cobalt oxide of the shell part.

3. The positive electrode active material for the secondary battery of claim 1, wherein the lithium cobalt oxide of the core part is $LiCoO_2$.

4. The positive electrode active material for the secondary battery of claim 1, wherein the lithium-deficient cobalt oxide of the shell part is $Li_{0.8}CoO_2$.

5. The positive electrode active material for the secondary battery of claim 1, wherein the shell part includes a relatively low concentration of lithium, compared to the core part, and lithium of the core part is distributed at a uniform concentration in the core part, and lithium of the shell part is distributed with a gradually increasing concentration gradient from the interface of the core and shell parts to the outer surface of the shell part.

6. The positive electrode active material for the secondary battery of claim 1, wherein a thickness of the shell part is 30 nm to 500 nm.

7. The positive electrode active material for the secondary battery of claim 1, wherein an average particle size (D50) of the positive electrode active material is 15 μm to 25 μm.

8. The positive electrode active material for the secondary battery of claim 1, wherein the surface of the shell part is coated with $Al_2O_3$.

9. The positive electrode active material for the secondary battery of claim 8, wherein a coating thickness of $Al_2O_3$ is 50 nm to 100 nm.

10. A method of preparing the positive electrode active material for the secondary battery of claim 1, the method comprising:
(a) forming a spherical core part including lithium cobalt oxide by mixing a cobalt source material and a lithium source material and then by primary sintering of the mixture;
(b) uniformly coating the outer surface of the core part with the cobalt source material, and then further injecting the lithium source material to mix them; and
(c) forming a shell part by secondary sintering of the mixture of the process (b), wherein in the process (b), the amounts of the cobalt source material and the lithium source material are determined such that the molar ratio of lithium:cobalt in the shell part formed by the secondary sintering of the process (c) is within the range of 0.7:1 to 0.9:1.

11. The method of preparing the positive electrode active material for the secondary battery of claim 10, wherein in the process (a) and/or the process (b), sintering is carried out by further adding a doping precursor containing an element A, wherein the element A is one or more selected from the group consisting of Ti, Mg, Al, Zr, Ba, Ca, Ti, Ta, Nb and Mo.

12. The method of preparing the positive electrode active material for the secondary battery of claim 10, wherein in the process (b), the amounts of the cobalt source material and the lithium source material are determined such that the molar ratio of lithium:cobalt in the shell part formed by the secondary sintering of the process (c) is within the range of 0.8:1.

13. The method of preparing the positive electrode active material for the secondary battery of claim 10, wherein in the process (a), a temperature of the primary sintering is 950° C. to 1070° C., and a time of the primary sintering is 8 hours to 12 hours.

14. The method of preparing the positive electrode active material for the secondary battery of claim 10, wherein in the process (c), a temperature of the secondary sintering is 900° C. to 1050° C., and a time of the secondary sintering is 5 hours to 12 hours.

15. A positive electrode which is manufactured by applying a slurry including the positive electrode active material for the secondary battery of claim 1, a conductive material, and a binder onto a collector.

16. A lithium secondary battery comprising the positive electrode of claim 15, a negative electrode, and an electrolyte.

* * * * *